United States Patent
Wu et al.

(10) Patent No.: US 12,250,702 B2
(45) Date of Patent: Mar. 11, 2025

(54) METHOD AND SYSTEM FOR IMPROVED SOUNDING REFERENCE SIGNAL (SRS) OVERHEAD AND FLEXIBLE REUSE SCHEME

(71) Applicant: ZTE Corporation, Guangdong (CN)

(72) Inventors: Hao Wu, Shenzhen (CN); Chuangxin Jiang, Shenzhen (CN); Bo Gao, Shenzhen (CN); Shujuan Zhang, Shenzhen (CN); Yuxin Wang, Shenzhen (CN); Zhaohua Lu, Shenzhen (CN); Yu Ngok Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 343 days.

(21) Appl. No.: 17/856,345

(22) Filed: Jul. 1, 2022

(65) Prior Publication Data
US 2022/0338190 A1 Oct. 20, 2022

Related U.S. Application Data

(63) Continuation of application No. PCT/CN2020/084338, filed on Apr. 11, 2020.

(51) Int. Cl.
| | | |
|---|---|---|
| H04W 72/51 | (2023.01) | |
| H04L 1/1607 | (2023.01) | |
| H04L 5/00 | (2006.01) | |
| H04W 72/0446 | (2023.01) | |
| H04W 72/23 | (2023.01) | |

(52) U.S. Cl.
CPC ........... *H04W 72/51* (2023.01); *H04L 1/1614* (2013.01); *H04L 5/0051* (2013.01); *H04W 72/0446* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2014/0241242 A1 | 8/2014 | Josiam et al. | |
| 2018/0206132 A1 | 7/2018 | Guo et al. | |
| (Continued) | | | |

FOREIGN PATENT DOCUMENTS

| | | | |
|---|---|---|---|
| CN | 109923828 A | 6/2019 | |
| CN | 110034889 A | 7/2019 | |
| (Continued) | | | |

OTHER PUBLICATIONS

Extended European Search Report for corresponding application No. EP 20897289.3 dated May 8, 2023, 8p.

(Continued)

*Primary Examiner* — Clemence S Han
(74) *Attorney, Agent, or Firm* — Crowell & Moring LLP

(57) ABSTRACT

Methods and systems for transmitting one or more sounding reference signal (SRS) resource sets for one or more usages are disclosed herein. In one embodiment, a method performed by a user equipment includes: receiving one or more configuration parameters from a wireless network node; determining, based on the one or more configuration parameters, one or more usages for a plurality of SRS resources within the one or more SRS resource sets; and transmitting an SRS using the plurality of SRS resources configured for the one or more usages.

21 Claims, 9 Drawing Sheets

(56) References Cited

U.S. PATENT DOCUMENTS

| | | | |
|---|---|---|---|
| 2019/0158236 A1 | 5/2019 | Yoo et al. | |
| 2019/0215110 A1 | 7/2019 | Yang et al. | |
| 2019/0281588 A1 | 9/2019 | Zhang et al. | |
| 2019/0312617 A1 | 10/2019 | Wernersson et al. | |
| 2019/0356445 A1 | 11/2019 | Manolakos | |
| 2020/0028638 A1 | 1/2020 | Liu et al. | |
| 2020/0092861 A1 | 3/2020 | Xu et al. | |
| 2020/0119953 A1 | 4/2020 | Chen et al. | |
| 2020/0228190 A1 | 7/2020 | Cirik et al. | |
| 2020/0280404 A1* | 9/2020 | Qin | H04L 27/2613 |
| 2020/0336340 A1 | 10/2020 | Qin et al. | |
| 2021/0204297 A1 | 7/2021 | Wu et al. | |
| 2021/0289561 A1 | 9/2021 | Liu et al. | |
| 2021/0400696 A1 | 12/2021 | Maki et al. | |
| 2022/0104187 A1* | 3/2022 | Zhou | H04W 1/1822 |
| 2022/0110109 A1* | 4/2022 | Tsai | H04W 72/27 |
| 2022/0248385 A1* | 8/2022 | Cha | H04W 52/0216 |
| 2022/0263621 A1* | 8/2022 | Cha | G01S 1/0428 |
| 2023/0079945 A1* | 3/2023 | Manolakos | H04L 1/08 370/329 |
| 2023/0114925 A1* | 4/2023 | Yang | H04L 5/0094 370/329 |
| 2024/0014971 A1* | 1/2024 | Zheng | H04L 5/0053 |

FOREIGN PATENT DOCUMENTS

| | | |
|---|---|---|
| CN | 110035484 A | 7/2019 |
| CN | 110167168 A | 8/2019 |
| CN | 110943816 A | 3/2020 |
| KR | 10-2011-0133448 A | 12/2011 |
| WO | WO 2019/028834 A1 | 2/2019 |
| WO | WO 2020/072213 A1 | 4/2020 |

OTHER PUBLICATIONS

Huawei et al., "Maintenance of SRS for NR positioning", 3GPP TSG RAN WG1 Meeting #100e, R1-2000191, Mar. 6, 2020, 6p.
Vivo, Discussion on remaining issues on UL RS for NR positioning, 3GPP TSG RAN WG1 Meeting #100e, R1-2000342, Mar. 6, 2020, 8p.
Vivo, "On Rel-16 UE Features", 3GPP TSG RAN WG1 Meeting #100e, R1-2000351, Mar. 6, 2020, 32p.
OPPO, "Text proposals for full TX power UL transmission", 3GPP TSG RAN WG1 Meeting #100e, R1-2000459, Mar. 6, 2020, 8p.
OPPO, "Discussion on RE mapping in reference signal for NR positioning", 3GPP TSG RAN WG1 Meeting #100e, R1-2000466, Mar. 6, 2020, 3p.
Nokia, et al., "Remaining issues on DL signals and channels", 3GPP TSG RAN WG1 Meeting #100e, R1-2000501, Feb. 28, 2020, 16p.
Lenovo et al., "Remaining issues on additional SRS symbols", 3GPP TSG RAN WG1 Meeting #100e, R1-2000594, Mar. 6, 2020, 4p.
LG Electronics, "Remaining issues of DL reference signals for NR Positioning", 3GPP TSG RAN WG1 Meeting #100e, R1-2000686, Mar. 6, 2020, 3p.
CMCC, "Discussions on UL SRS for positioning collision rules", 3GPP TSG RAN WG1 Meeting #100e, R1-2000761, Mar. 6, 2020, 3p.
CMCC, "Remaining issues on support of unaligned frame boundary with a slot alignment and partial SFM alignment", 3GPP TSG RAN WG1 Meeting #100e, R1-2000763, Mar. 6, 2020, 14p.
Vivo, "Summary of UE adaptation to maximum number of MIMO layers", 3GPP TSG RAN WG1 Meeting #100e, R1-2000803, Mar. 6, 2020, 3p.
Ericcson, "Remaining issues for inter-band CA with unaligned frame boundary", 3GPP TSG RAN WG1 Meeting #100e, R1-2000892, Mar. 6, 2020, 3p.
NTT DOCOMO, Inc., "Summary on remaining issues for Rel. 16 enhanced configured grant", 3GPP TSG RAN WG1 Meeting #100e, R1-2000923, Mar. 6, 2020, 23p.
AT&T et al., "RAN1 UE features list for Rel-16 NR", 3GPP TSG RAN WG1 Meeting #100e, R1-2000930, Mar. 6, 2020, 7p.
Qualcomm Incorporated, "Discussion", 3GPP TSG RAN WG1 Meeting #100e, R1-2000984, Mar. 6, 2020, 79p.
OPPO, "Summary#1 on UCI enhancements for R16 URLLC", 3GPP TSG RAN WG1 Meeting #100e, R1-2001016, Mar. 6, 2020, 51p.
Nokia et al., "Procedure of cross-slot scheduling power saving techniques", 3GPP TSG RAN WG1 Meeting #100e, R1-2001049, Mar. 6, 2020, 12p.
Nokia et al., "On remaining open issues for per-BWP DL MIMO layers", 3GPP TSG RAN WG1 Meeting #100e, R1-2001050, Mar. 6, 2020, 2p.
CMCC, "FL summary on support of unaligned frame boundary for R16 NR inter-band", 3GPP TSG RAN WG1 Meeting #100e, R1-2001131, Mar. 6, 2020, 4p.
Huawei, "Feature summary on LTE DL MIMO efficiency enhancement", 3GPP TSG RAN WG1 Meeting #100e, R1-2001139, Mar. 6, 2020, 17p.
CMCC, "FL summary on support of unaligned frame boundary for R16 NR inter-band", 3GPP TSG RAN WG1 Meeting #100e, R1-2001154, Mar. 6, 2020, 4p.
NTT DOCOMO, Inc., "Summary#2 on remaining issues for Rel. 16 enhanced configured grant", 3GPP TSG RAN WG1 Meeting #100e, R1-2001171, Mar. 6, 2020, 25p.
Huawei, Feature summary #2 on LTE DL MIMO efficiency enhancement, 3GPP TSG RAN WG1 Meeting #100e, R1-2001179, Mar. 6, 2020, 17p.
Vivo, "Summary#2 of UE adaptation to maximum number of MIMO layers", 3GPP TSG RAN WG1 Meeting #100e, R1-2001189, Mar. 6, 2020, 3p.
Examination Report for corresponding Canadian application No. 3,163,252 dated Oct. 16, 2023, 4p.
International Search Report for priority application No. PCT/CN2020/084338 dated Jan. 4, 2021, 3p.
Written Opinion for priority application No. PCT/CN2020/084338 dated Jan. 4, 2021, 4p.
Ericsson, "UL signals and channels for NR-U", 3GPP TSG-RAN WG1 Meeting #96bis, R1-1904334, Apr. 12, 2019, section 4, 9p, CN.
Zte et al., "Consideration on UL reference signals and channels design for NR-U", 3GPP TSG RAN WG1 Meeting #97, R1-1905950, May 17, 2019, Section 2.4, 11p, US.
Qualcomm Incorporated, "Agreements in NR-U WI up to RAN1 #98", 3GPP TSG RAN WG1 Meeting #98bis, R1-1909920, Oct. 20, 2019, section 7.2.2.1.3, part "RAN1 #96bis, Apr. 2019", 19p, CN.
Office Action issued in Chinese Patent Application No. 202080095285.5 dated Sep. 26, 2024, w/English translation, 34 pages.
Xie Lijun, Research and implementation of PUCCH and SRS detection receiving technology in TD-LTE system, "China Excellent Master's Dissertation Full Text Database", 04; Apr. 15, 2018, w/Partial English translation, 78 pages.
Chinese Office Action with English translation, Sep. 29, 2024, pp. 1-13, issued in Chinese Patent Application Number 202080099359.2, China National Intellectual Property Administration.
Sony, Summary of SRS, May 21-25, 2018, pp. 1-57, 3GPP TSG RAN WG1 Meeting #93, R1-1807602, Busan, Korea.
Examination Report for corresponding Canadian application No. 3,163,252 dated Aug. 19, 2024, 5 pages.
International Search Report for priority application No. PCT/CN2020/084337 dated Dec. 31, 2020, 2p, in English language.
Written Opinion for priority application No. PCT/CN2020/084337 dated Dec. 31, 2020, 3p, in English language.
Nokia, "Corrections of NR positioning support", 3GPP TSG-RAN WG1 Meeting #100, R1-2001449, Mar. 6, 2020, 9p.
Extended European Search Reported for corresponding European application No. 20895546.8 dated Jun. 30, 2023, 18p.
Huawei et al., "Corrections on additional SRS symbols", 3GPP TSG RAN WG1 Meeting #100e, R1-2000225, Change Request, Mar. 6, 2020, 3p.
Huawei et al., "Remaining issues of additional SRS symbols", 3GPP TSG RAN WG1 Meeting #100e, R1-2000226, Mar. 6, 2020, 2p.

(56) References Cited

OTHER PUBLICATIONS

Nokia et al., "Maintenance for additional SRS symbols", 3GPP TSG RAN WG1 Meeting #100e, R1-2000559, Mar. 6, 2020, 1p.
Catt, "TP for SRS configuration", 3GPP TSG RAN WG1 Meeting #100e, R1-2000647, Mar. 6, 2020, 1p.
LG Electronics, "Text proposals on additional SRS symbols", 3GPP TSG RAN WG1 Meeting #100e, R1-2000655, Mar. 6, 2020, 4p.
Qualcom Incorporated, "Maintenance for Additional SRS symbols", 3GPP TSG RAN WG1 Meeting #100e, R1-2000710, Mar. 6, 2020, 6p.
Ericsson, "Maintenance for additional SRS symbols", 3GPP TSG RAN WG1 Meeting #100e, R1-2000942, Mar. 6, 2020, 5p.
Huawei, "Feature summary #1 on [100e-LTE_DL_MIMO_EE-AddSRS-01]", 3GPP TSG RAN WG1 Meeting #100e, R1-2001283, Mar. 6, 2020, 10p.
Ericcson, "LS on outcome of email discussions on aperiodic SRS for positioning configuration from RAN#100e", 3GPP TSG RAN WG1 Meeting #100e, R1-2001386, Mar. 6, 2020, 1p.
Ericsson, "LS on outcome of email discussions on aperiodic SRS for positioning configuration from RAN1#100e", 3GPP TSG RAN WG1 Meeting #100e, R1-2001483, Mar. 6, 2020, 1p.
Huawei et al., "Remaining issues on SRS configuration", 3GPP TSG RAN WG2 Meeting #109e, R2-2000967, Mar. 6, 2020, 4p.
Intel Corporation, "Downgrading configuration of SRS for antenna switching—Alternative 2", 3GPP TSG RAN WG2 Meeting #109-3, R2-2001276, Change Request, Mar. 6, 2020, 8p.
Huawei et al., "Introduction of DL MIMO efficiency enhancements", RGPP TSG RAN Meeting #109e, R2-2001406, Change Request, Mar. 6, 2020, 89p.
Huawei et al., "Introduction of DL MIMO efficiency enhancement", 3GPP TSG RAN Meeting #109e, R2-2001735, Change Request, Mar. 6, 2020, 28p.
OPPO, "Introduction of downgraded configuration for SRS antenna switching," 3GPP TSG RAN2 Meeting #109e, R2-2002067, Mar. 6, 2020, 5p.
OPPO et al., "Introduciton of downgraded configuration for SRS antenna switching", 3GPP TSG RAN2 Meeting #109e, R2-2002261, Change Request, Mar. 6, 2020, 5p.
Rapporteur, "Summary of [AT109e][058][TEI16] Downgraded configuration SRS antenna switching (Intel OPPO)", 3GPP TSG RAN WG2 Meeting #109e, R2-2002273, Mar. 6, 2020, 5p.
Partial Supplementary European Search Report for application No. EP 20895546.8 dated Mar. 24, 2023, 18p.
CATT, "Remaining issues on SRS", 3GPP TSG RAN WG1 Meeting #92, R1-1801726, Mar. 2, 2018, 3p, GR.
Samsung, "Issues on SRS", 3GPP TSG RAN WG1 Meeting #92, R1-1801971, Mar. 2, 2018, 4p, GR.
Zeng, Tianyi et al., "CSI-RS Based Joint Grouping and Scheduling Scheme with Limited SRS Resources", *IEEE*, 2018 29th Annual International Symposium on PIMRC, Sep. 9, 2018, 6p.
ZTE et al., "Considerations on UL reference signals and channels design for NR-U", 3GPP TSG RAN WG1 Meeting #97, R1-1905950, May 17, 2019, 11p, US.

\* cited by examiner

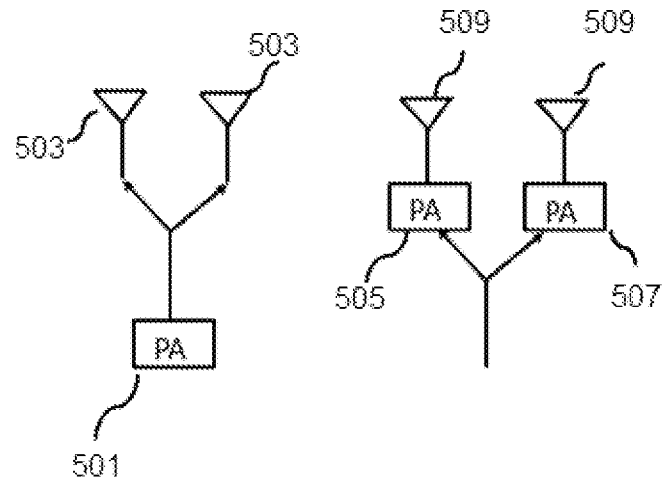

METHOD AND SYSTEM FOR IMPROVED SOUNDING REFERENCE SIGNAL (SRS) OVERHEAD AND FLEXIBLE REUSE SCHEME

This application is a continuation of International Application No. PCT/CN2020/084338, filed Apr. 11, 2020, the entirety of which is hereby incorporated by reference.

TECHNICAL FIELD

The disclosure relates generally to wireless communications and, more particularly, to methods and systems for sounding reference signal configurations to support uplink and downlink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., time, bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, and Long Term Evolution (LTE).

A wireless communication network may include a number of base stations (BSs) that support communication for a number of user equipments (UEs). A UE may communicate with a base station via a downlink (DL) (or forward link) and an uplink (UL) (or reverse link). The DL refers to the communication link from the BS to the UE, and the UL refers to the communication link from the UE to the BS. As will be described in more detail herein, a BS may be referred to as a Node B, a g Node B (gNB), an access point (AP), a radio head, a transmit receive point (TRP), a new radio (NR) BS, a 5G Node B, and/or the like.

The above multiple access technologies have adopted in various telecommunication standards providing a common protocol that enables different user equipment to communicate on various geographical levels. A 5G NR (New Radio) is a multiple access technology promulgated by the Third Generation Partnership Project (3GPP) intended for the 5G (fifth generation) mobile networks. The 5G NR provides higher data rates and greater capacity, with improved reliability and lower latency, which enhances mobile broadband services. The 5G NR also enables new classes of services for vehicular, fixed wireless broadband, and the Internet of Things (IoT).

To support increased data rates, Multiple Input Multiple Output (MIMO) antenna systems are used in the 5G NR to beamform signals transmitted between BSs and UEs. The MIMO system can provide improved performance (e.g., higher throughput and/or greater reliability) if the additional dimensionalities created by the multiple transmit and receive antennas are utilized. However, 5G NR with MIMO systems may exhibit a poor propagation phenomenon such as multipath, which may result in radio signals arriving at the receiving antenna via two or more paths. Thus, the key requirement for enjoying the benefit of MIMO technology is to obtain an accurate channel state information (CSI) for each wireless link.

One way to obtain CSI at a transmitter of a BS is through the use of an uplink (UL) listening channel. Channel listening is a signaling mechanism in which a UE transmits pilot signals or sounding reference signals (SRS) on an UL channel to enable a BS to estimate the UL channel response. This approach assumes reciprocity of uplink and downlink channel (DL) channels, while UL and DL reciprocity usually exist in Time Division Duplexing (TDD) systems. Moreover, the number of UL SRS required in the approach mentioned above for DL channel estimation is proportional to the number of served UEs and is irrespective of the number of BS antennas.

In addition, to obtaining wide- or sub-band CSI of an UL channel, BS may use SRSs for assisting UL medium access control (MAC) scheduler in allocating UEs to resource blocks (RBs). Base stations can utilize the SRSs in allocating uplink resources to the transmitting terminal.

In current 5G NR wireless communication systems, channel listening with SRS supports a diverse set of use cases. For example, SRS can be used at the BS simply to obtain signal strength measurements, e.g, for the purposes of UL beam management. On the other hand, SRS can be used at the BS to obtain detailed amplitude and phase estimates as a function of frequency, time, and space. Other usages for SRS include UL CSI acquisition for codebook/non-codebook modes. In codebook/non-codebook scenarios reciprocity cannot/can be assumed between downlink and uplink. Yet another usage for SRS is uplink beam management based on a set of SRS resources transmitted by a UE to a BS. In current 5G NR wireless communication systems, SRSs are configured within an SRS resource set that comprises one or more SRS resources. Furthermore, in current 5G NR wireless communication systems, an SRS resource set contain a parameter called "usage" that specifies a single usage for the SRS resource set appropriate for the indicated use case.

In this context, the assignment of UEs to UL SRSs has become critical in 5G standardization efforts, as it can significantly affect the system performance. Since the number of UL SRSs for a given bandwidth is limited, and because the number of multiplexed UEs may be significantly larger than that in existing systems, resulting in large resource overhead. Thus, UL SRSs reuse methods and systems are needed to reduce the resource overhead consumption.

In addition, in current 5G NR as well as in 3GPP LTE-Advanced (LTE-A) wireless communication systems, two types of SRS are defined. A first type of Periodic SRS (p-SRS) is used for obtaining long-term channel information. The periodicity of p-SRS is in general long (up to 320 ms) to reduce overhead. The p-SRS parameters are configured by higher layer radio resource control (RRC), so configuration time is long (e.g., 15-20 ms) resulting in a low signaling flexibility. For uplink MIMO, p-SRS resource is highly demanded for close-loop spatial multiplexing, especially when the number of UEs becomes large. A second type of Aperiodic SRS (ap-SRS) is a new feature that is triggered either by downlink or uplink grant via physical downlink control channel (PDCCH). Once triggered, the UE transmits a sounding sequence in a pre-defined location for one-time transmission. Ap-SRS supports multi-antenna sounding for uplink MIMO. Ap-SRS is much more flexible than p-SRS. As such, this pre-defined location for one-time transmission of ap-SRS is defined by a number of time slot offsets from receiving the downlink control information (DCI) trigger carried in PDCCH. However, the pre-defined location for one-time transmission of ap-SRS is restrictive since it only allows for one SRS resource to occupy continuous OFDM symbols in one slot. Thus, a need for an enhanced aperiodic SRS triggering exists.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method for transmitting one or more sounding reference signal (SRS) resource sets for one or more usages performed by a user equipment includes: receiving one or more configuration parameters from a wireless network node; determining, based on the one or more configuration parameters, one or more usages for a plurality of SRS resources within the one or more SRS resource sets; and transmitting an SRS using the plurality of SRS resources configured for the one or more usages.

In another embodiment, a method performed by a base station for receiving one or more sounding reference signal (SRS) resource sets configured for one or more usages includes: transmitting one or more configuration parameters to a user equipment; and receiving the SRS in a plurality of SRS resources configured by the user equipment (UE), wherein the plurality of SRS resources are configured for one or more usages.

In further embodiments, a method performed a user equipment for transmitting an aperiodic sounding reference signal (SRS) includes: receiving a time slot offset for a SRS resource or a SRS resource subset within an SRS resource set, wherein the time slot offset indicates a position in time, relative to a receiving time slot of a downlink control information (DCI), when the aperiodic SRS transmission is triggered; and receiving the DCI; and transmitting each SRS resource in the SRS resource subset or in the SRS resource set at a time corresponding to the time slot offset.

In further embodiments, a method performed by a user equipment for transmitting a sounding reference signal (SRS) includes: receiving one or more configuration parameters indicating at least one of one or more starting positions of one or more sets of continuous Orthogonal Frequency-Division Multiplexing (OFDM) symbols or continuous uplink (UL) OFDM symbols and a bitmap indicating a selection of OFDM symbols; determining a set of time domain resources for transmitting the SRS based on the one or more configuration parameters; and transmitting the SRS within the set of time domain resources.

In further embodiments, the disclosure provides an apparatus that is configured to perform any one of the methods disclosed herein.

In further embodiments, the disclosure provides a non-transitory computer-readable storage medium storing computer-executable instructions that when executed perform any one of the methods disclosed herein.

In yet further embodiments, a wireless communication node includes a memory storing computer-executable instructions that when executed perform any one of the methods disclosed herein; and at least one processor, coupled to the memory, and configured to execute the computer-executable instructions.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIGS. 5A-5B illustrate block diagram of radio frequency (RF) transceiver chains, in accordance with some embodiments of the disclosure.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

As discussed herein, a "wireless communication node" can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc., in accordance with the customary understanding of these terms in the art. Furthermore, as discussed herein, a "wireless communication device" can include, or be implemented as, a station (STA), a mobile terminal (MT), mobile station (MS), etc., in accordance with the customary understanding of these terms in the art. In the description of exemplary embodiments below, the "wireless communication node" is referred to as a base station "BS" and the "wireless communication device" is referred to as a user equipment "UE." It should be understood, however, that the scope of the present disclosure is not limited to these exemplary embodiments.

Figure 1A:
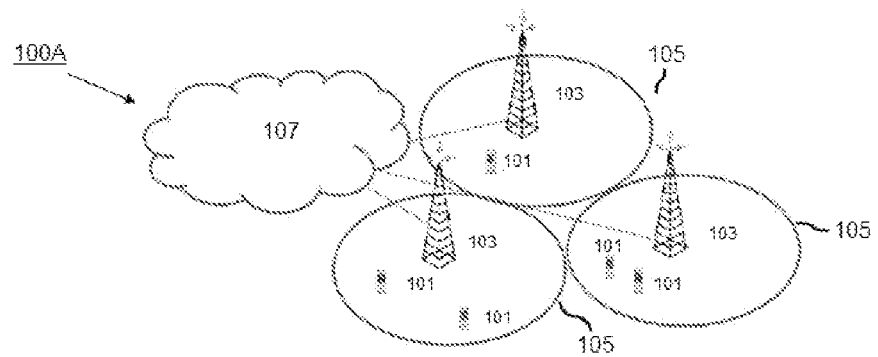
FIG. 1A is a block diagram illustrating an example of a wireless communication network, in accordance with some embodiments of the disclosure.

FIG. 1 is a diagram illustrating an example of a wireless communication network 100A, in accordance with various embodiments of the present disclosure. The wireless communication network 100A may be an LTE network or some other wireless network, such as a 5G NR network. The wireless communication network 100A may include a number of BSs 103 and a number of UEs 101. In some embodiments, the BSs 103 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages.

In addition, each BS 103 may provide communication coverage for a particular geographic area 105. In some embodiments, the geographic area covered by a BS and/or a BS subsystem serving this geographic area may be refereed as a "cell." There may be overlapping geographic coverage areas 105. In other embodiments, the BSs 103 may be interconnected to one another and/or to one or more other BSs through various types of backhaul links 107. The backhaul links 107 may include interfaces such as direct physical connection, a virtual network, and/or the like using any suitable transport network. The backhaul links 107 may be wired or wireless.

Wireless communication network 100A may be a heterogeneous network that includes BSs 103 of different types, e.g., macro BSs, pico BSs, femto BSs, relay BSs, and/or the like. These different types of BSs may have different transmit power levels, different coverage areas, and different impact on interference in wireless communication network 100A. For example, macro BSs may have a high transmit power level (e.g., 5 to 40 Watts) whereas pico BSs, femto BSs, and relay BSs may have lower transmit power levels (e.g., 0.1 to 2 Watts).

UEs 101 may be dispersed throughout wireless network 100A, and each UE may be stationary or mobile. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Figure 1B:
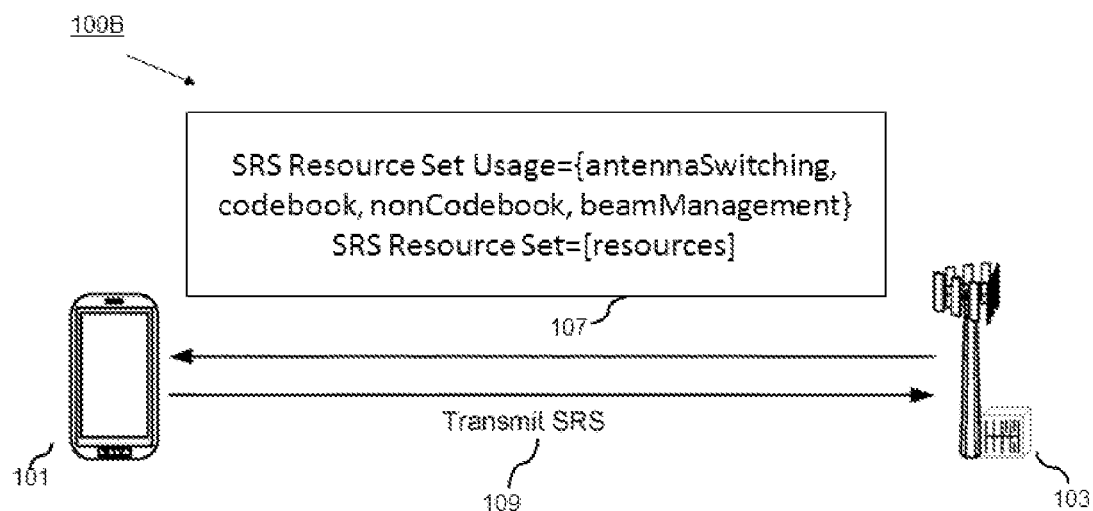
FIG. 1B is a block diagram illustrating an example of a wireless communication network, in accordance with some embodiments of the disclosure.

FIG. 1B is a diagram illustrating an example 100B of sounding reference signal (SRS) configurations, in accordance with various embodiment of the present disclosure. In some embodiments, the base station 103 may configure the UE 101 with one or more sounding reference signal (SRS) resource sets. In various embodiments, SRS resources are configured within an SRS resource set comprising of one or more SRS resources. This configuration mechanism simplifies the activation (e.g., semi-persistent) and the DCI triggering (e.g., aperiodic SRS) since multiple resource can be activated/triggered simultaneously.

Referring again to FIG. 1B, in some embodiments, the BS 103 may configure the UE 101 with one or more SRS resource sets to allocate resources for SRS transmissions by the UE 101. For example, the BS 103 may transmit one or more configuration parameters or an indication of an SRS resource set 107 to the UE 101. In further embodiments, the one or more configuration parameters may be carried in a radio resource control (RRC) message (e.g., an RRC configuration message, and RRC reconfiguration message) and/or the like. In some embodiments, the one or more configuration parameters or the RRC message transmitted from the BS 103 may specify a parameter called "usage." Depending on the usage parameter, SRS resource set(s) may have different configurations appropriate for the indicated use case. For example, SRS resource sets can be configured with different usages, such as "antenna switching", "codebook", "non-codebook", and "beam management." In other embodiments, the SRS resource set(s) may be configured to have multiple usages. For example, the SRS resource set(s) may be configured to have "codebook" and "beam management" usages. One exemplary advantage of SRS resource reuse among different usage is that it reduces the overhead consumption of SRS resources.

As shown by reference number 109, UE 101 may transmit the configured SRS to BSs, which may utilize the received SRS to determine the uplink channel quality, link adaptation, or downlink scheduling under channel reciprocity. In further embodiments, the BS may utilize the received SRS to allocate uplink resources to transmitting UEs.

Figure 2:
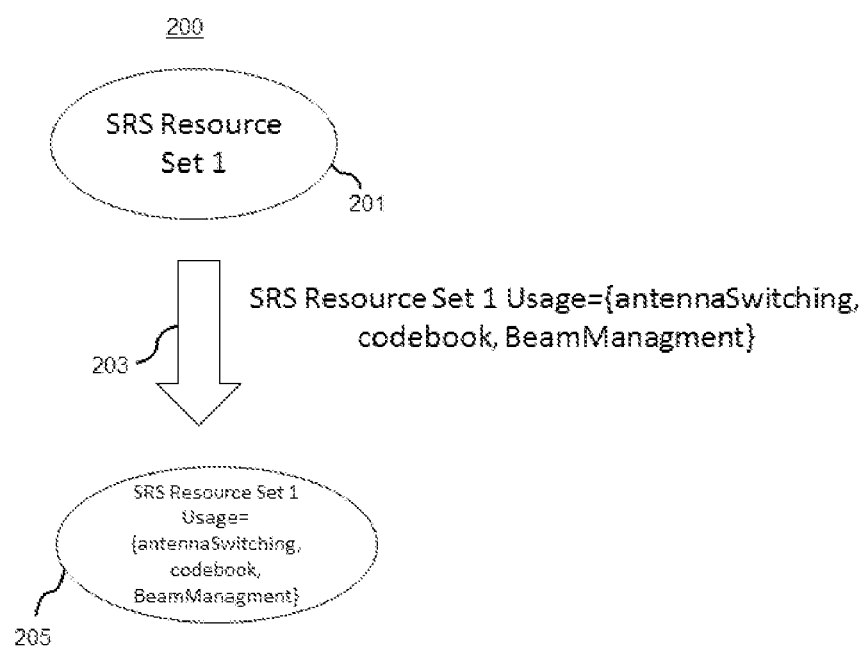
FIG. 2 is a block diagram illustrating an example of a sounding reference signal (SRS) configurations to support multiple usage, in accordance with various embodiments of the disclosure.

FIG. 2 illustrates an example of a sounding reference signal (SRS) configurations scheme 200 enabling support for multiple usages. In some embodiments, a configuration information 203 for an SRS resource set 201 may indicate one or more time-frequency resources in which an SRS is to be transmitted, and may indicate one or more antenna ports on which the SRS is to be transmitted in those time-frequency resources. In other embodiments, the configuration for an SRS resource set may indicate a use case (e.g., in an SRS Resource Set Usage={antennaSwitching, codebook, BeamManagment} information element) for an SRS resource set 205. For example, the BS 103 may configure one or more SRS resource set(s) 201 with configuration information 203 indicating multiple usage for the SRS resource set(s) 205. In some embodiment, a list of usages can be configured for the SRS resource set 201 indicating that all or part of the SRS resources in the SRS resource set 201 are used for antenna switching, codebook based UL, and beam management.

In further embodiment, a bitmap can be configured for one or more SRS resource sets to indicate the use cases for all or a subset of the SRS resources in the configured SRS resource set(s). For example, from the set of {"antenna switching", "codebook", "non-codebook", "beam management"} SRS resource usages, the "1001" in the bitmap may indicate the usages {"antenna switching", "beam management"} selected from the set of the SRS resource usages for all or a subset of the SRS resources in the configured SRS resource set(s).

Yet in another embodiment, a combined usage parameter may defined to indicate multiple usages for all or a subset of the SRS resources in the configured SRS resource set(s). For example, a combined usage parameter "antenna switching and codebook" may be configured to indicate all or a subset of the SRS resources in the configured SRS resource set(s) are used for both antenna switching and codebook based UL use cases.

An antenna switching SRS resource set may be used to indicate downlink channel state information (CSI) with reciprocity between an uplink and downlink channel. For example, the BS 103 may configure one or more SRS resource sets 201 with usage parameters 203 comprising of "antennaSwitching" value. The number of SRS resource set(s) configured for antenna switching depends on the UE 101 capability which may be expressed in terms of the number of simultaneously usable Tx (e.g., transmit) and Rx (e.g., receive) antenna chains. In some embodiments, the UE 101 may be capable of transmitting simultaneously in the uplink on as many antennas as used by the BS 103 for reception in the downlink. For example, the BS 103 may configure the UE 101, using the configuration parameter 203, with SRS resource set(s) comprising an SRS resource for which a number of SRS ports is equal to a number of UE antenna ports. Subsequent to receiving an SRS from the UE 101, the BS 103 may be able to acquire downlink CSI based on estimates of the full UL spatial channel based on the configured SRS resource(s). In this embodiment, the UE 101 may indicate its capability from the following set of values: 1T1R, 2T2R, and 4T4R, where "T" represents transmit chains (Tx antennas) and "R" indicates receive chains (Rx antennas).

In other embodiments, the UE 101 may not be capable of transmitting on the same number of antennas as the number of receive antennas, a partial sounding may be performed through antenna switching. For example, if the UE 101 has four receive antennas but it is only capable to transmit on two of them simultaneously, then the UE may indicate "2T4R" during its capability exchange procedure. That is, the BS 103 may request the UE 101, in order to acquire CSI for the full spatial channel, to first transmit a first two-port SRS resource on a first UE antenna port during one time instance and subsequently transmit a second two-port SRS resource on a second UE antenna port in a later time instance. As another example, for an SRS resource set(s) configured for "2T4R" antenna switching, two SRS resources within the SRS resource set(s) are configured and each SRS resource may include a two-port SRS resource. In further embodiments, an SRS resource set(s) used for xTyR antenna switching, where x is the number of transmit antennas and y is the number of receive antennas, y/x or ⌊y/x⌋ (⌊y/x⌋ is the floor of y/x) of SRS resources are configured and each SRS resource may include an x-port SRS resource, where x and y are integers. For example, x may be 1, 2 or 4, and y may be 1, 2, 4, 6 or 8.

A codebook SRS resource set may be used to indicate uplink CSI when a base station 103 indicates an uplink precoder (e.g., precoding matrix or weights) to the UE 101. For example, when the base station 103 is configured to indicate an uplink precoder to the UE 101 (e.g., using a precoder codebook), the base station 103 may use a codebook SRS (e.g., an SRS transmitted using a resource of a codebook SRS resource set) to acquire uplink CSI.

A non-codebook SRS resource set may be used to indicate uplink CSI when the UE 101 selects uplink precoding weights (e.g., instead of the BS 103 indicated uplink precoding weights) to be used by the UE 101. In this regard, the precoding weights are determined at the UE based on reception of an associated CSI-RS resource using the assumption of DL-UL reciprocity. In some embodiments, when the UE 101 is configured to select an uplink precoder (e.g., uplink precoding weights), the BS 103 may use a non-codebook SRS (e.g., an SRS transmitted using a resource of a non-codebook SRS resource set) to acquire uplink CSI.

A beam management SRS resource set may be used for indicating CSI for millimeter wave communications. As such, to support uplink beam management, one or more sets of SRS resources 201 with usage parameters 203 comprising of "beamManagement" value may be configured. In some embodiments, if the UE maintains a fixed spatial domain transmit filter over the set of SRS resources, the BS may adjust its spatial domain receive filter (receive beam) to optimize reception.

In some embodiments, one or more SRS resources in the SRS resource set(s) configured for one or more usages may include one or more SRS resource ports. Moreover, different SRS resources may have a same or different number of SRS resource ports.

Figure 3A:
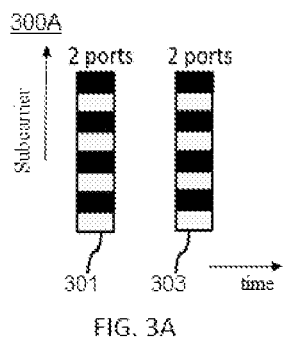
FIG. 3A illustrates an SRS resource set having two SRS time-frequency resources, in accordance with some embodiments of the disclosure.

FIG. 3A illustrates an SRS resource set 300A having two SRS time-frequency resources. In some embodiment, only a subset of SRS resources in the SRS resource set 300A may be configured for one or more usages. As such, the UE 101 may determine the subset of the SRS resources configured for one or more usages based on a pre-defined rule or a configuration parameter received from the BS 103. For example, as shown in FIG. 3A, SRS resources 301 and 303 within the SRS resource set 300A, each have two antenna ports. In this embodiment, both of the SRS resources 301 and 303 may be used for antenna switching, while the SRS resource 303 may also be used for codebook based UL.

In some embodiments of the present disclosure, the UE 101 may determine a set $\{U_1, U_2, \ldots, U_N\}$ of N usages for one or more SRS resources in the SRS resource set. In various embodiments, the UE 101 may determine a mapping between the set of usages and one or more SRS resources based on a predefined rule. For example, a first usage $U_1$ from the set of usages may be mapped to all the SRS resources in the SRS resource set, a second usage $U_2$ may be mapped to a first $X_2$ SRS resources in the SRS resource set having lowest SRS resource IDs, and the rest of the usages in the usage set may be mapped to the SRS resources in the SRS resource set in similar fashion. In further embodiment, the $X_2, X_3, \ldots, X_N$ SRS resources are integers and wherein $X_2, X_3, \ldots, X_N$ are ordered as follows:

In various embodiments of the present disclosure, the UE 101 may determine the mapping between usages from the set $\{U_1, U_2, \ldots, U_N\}$ of N usages and the SRS resources based on at least one or more configuration parameters received from the BS 103. For example, a first usage $U_1$ from the set of usages may be mapped to all the SRS resources in the SRS resource set. The BS 103 may also configure the one or more configuration parameters that indicate which resources may be used for a usage $U_i$, where $2 \leq t \leq N$. In some embodiments, the BS 103 may configure one or multiple bitmaps or resource IDs configured to select the SRS resources for the $U_i$.

As shown in FIG. 2, the SRS resource set 205 may be configured to have an antenna switching use case. In some embodiments, the SRS resource set having antenna switching usage may include a first SRS resource 301 and a second SRS resource 303, as shown in FIG. 3A. Thus, an antenna switching SRS may be transmitted in the SRS Resource 301 (e.g., a first time-frequency resource) using two antenna ports (e.g., antenna port 0 and antenna port 1), and may be transmitted in the SRS Resource 303 (e.g., a second time-frequency resource) using two antenna ports (e.g., antenna port 2 and antenna port 3).

In some embodiments, however, it is contemplated that there may be some special cases in which UEs may have different types of antenna switching capabilities due to having a limited number of radio frequency (RF) chains or limited antenna switching capability due to the Original Equipment Manufacturer (OEM) product. For example, a plurality of antenna switching capabilities may include various combinations of transmit (Tx) antennas and receive (Rx) antennas. Specifically, a UE may be configured to support at least two antenna switching capabilities from a set consisting of $\{(x, y), \text{where } x:=1, 2, 4 \text{ and } y:=1, 2, 4, 6, 8\}$, where capability (x, y) indicates support for x transmit (Tx) antennas and y receive (Rx) antennas. For example, a UE may indicate that it supports both 1T2R and 2T4R antenna switching capabilities.

In some embodiments, a BS may configure one or multiple SRS resource sets for one or more antenna switching capabilities from the set $\{(x, y)\}$. For example, if a UE supports at least two combinations, e.g., $(x_1, y_1)$ and $(x_2, y_2)$, where $x_1$ is less than $x_2$, and a BS may configure UE using antenna switching capability $(x_1, y_1)$, which may result in the UE not using its full transmit power for SRS transmission. Hence, the BS may need more information to accurately configure the UE. In some embodiments, a capabilities information of the UE may be reported to the BS in a UE capability signaling.

In some embodiments, a UE may report its capability of transmit power sharing among antennas of one or multiple usages to a BS. In this regard, the UE may signal its capability to the BS by reporting whether the maximum transmit power of $N_1$-antenna SRS equals to the maximum transmit power of $N_2$-antenna SRS, where $N_1$ and $N_2$ are integers, indicating number of UE antennas and $N_1$ is less than $N_2$. For example, $N_2$ is K times of N1, where K is an integer larger than 1. In various other embodiments, the UE may signal its capability to the BS by reporting a ratio between the maximum transmit power of $N_1$-antenna SRS and the maximum transmit power of $N_2$-antenna SRS, where $N_1$ and $N_2$ are integers and $N_1$ is less than $N_2$. In particular, the UE may report the ratio $K = N_2/N_1$, where K is an integer greater than 1. In other embodiments, the ratio may be at least of ¼, ½ and 1. In further embodiments, the UE may report the minimum number of antennas for SRS transmission that may achieve full transmit power. In other embodiments, the UE may report a maximum or minimum supported transmit power scaling value(s) for SRS transmission to the BS.

Figure 3B:
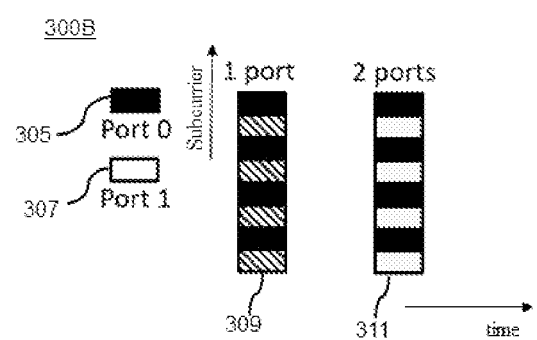
FIG. 3B shows an SRS resource having two antenna ports and configured for both antenna switching and codebook use cases, in accordance with further embodiments of the disclosure.

In some embodiments, UEs may have different capabilities for various usages. For example, the UE 101 may support a maximum of $A_1$ number antennas (or antenna ports) for antenna switching use case, while also supporting a maximum of $A_2$ number of antennas (or antenna ports) for another use case (e.g., UL transmission including codebook, non-codebook, and/or beam management). In some embodiments, a number of antenna ports of in different SRS resources within the SRS resource set may vary. FIG. 3B illustrates the above mentioned exemplary embodiment, wherein an SRS resource set 300B includes two SRS time-frequency resources with different number of antenna ports. In particular, FIG. 3B shows an SRS resource 311 having two antenna ports 305 and 307 and configured for both antenna switching and codebook use cases. Furthermore, the SRS resource set 300C also includes an SRS resource 309 having a single antenna port 305 and configured for antenna switching use case. In some embodiments, the UE 101 may determine which antenna ports in the SRS resource may be configured for a first usage from a set of usages. For example, the UE 101 may determine the antenna ports configured for the first usage in the SRS resource(s) used for both the first and a usages based on a predefined rule. In some embodiments, the UE 101 may configure a predetermined number of antenna ports (e.g., with lowest IDs) for the first usage. In other embodiments, the UE 101 may configure the antenna ports of the SRS resource(s) for the first usage based one or more configuration parameters received from the BS 103. In further embodiments, the one or more configuration parameters may be one or more bitmaps. In other embodiments, if at least two SRS resources for different usages are transmitted in overlapped resources, for the two SRS resources, the antenna ports with same port indexes are same ports. For example, the overlapped SRS resources can be antenna ports, frequency, time and/or code domain resources (e.g., sequence-related parameters).

Figure 3C:
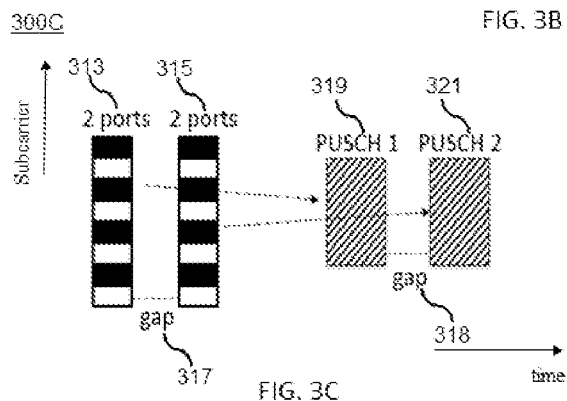
FIG. 3C illustrates a timing diagram for physical uplink shared channel (PUSCH) transmissions corresponding to the SRS resources with one or more usages, in accordance with further embodiments of the disclosure.

FIG. 3C illustrates a timing diagram for physical uplink shared channel (PUSCH) transmissions corresponding to the SRS resources with one or more usages. In some embodiments, two PUSCH transmissions 319 and 321 may be associated with two different SRS resources 313 and 315 within one SRS resource set 300C. In some embodiments, the SRS resources 313 and 315 may be used for both antenna switching and UL transmission (e.g., codebook based UL and/or non-codebook based UL). Moreover, a gap 318 may exists in between the two PUSCH 319 and 312 transmissions. In some embodiments, a length (e.g., a number of OFDM symbols) of the gap 318 is same as a length of a gap 317 between the two SRS resources 313 and 315.

In further embodiments, the UE 101 may spilt a limited transmit power $P_{SRS}$ equally across multiple antenna ports configured for SRS transmission. As such, if at least two SRS resources from two different SRS resource sets collide in antenna ports, time, frequency and/or code domain during at least one SRS transmission occasion, or if at least two SRS resources from two different SRS resource sets are configured to share (or reuse) the same physical resources, the transmit power of each collided SRS resource may be determined based on the antenna ports, SRS resource IDs or the time, frequency or code domain resources specified in the two collided SRS resources. In one embodiment, the time domain resources may be periodic, aperiodic, or semi-persistent. In some embodiments, the UE may scale transmit power $P_{SRS}$ for each collided (or shared) SRS resource by a factor S if the two SRS resources have the same resource ID. In other embodiments, the UE may scale transmit power for each collided (or shared) SRS resource by a factor S, if the two collided (or shared) SRS resources have the same antenna port(s). In some embodiments, the UE may scale transmit power $P_{SRS}$ for each collided (or shared) SRS resource by a factor S if the two collided (or shared) SRS resources are fully overlapped in time, frequency and code domain (e.g., fully overlapped in resource elements (REs), cyclic shifts and SRS sequences). In other embodiment, the transmit power scaling factor S may be equal to 1. In further embodiments, if within the two collided (or shared) SRS resources, a first SRS resource has time, frequency and code domain resources (e.g., REs, cyclic shifts, SRS sequences) that are a subset of a second SRS resource's time, frequency and code domain resources, the UE 101 may scale the transmit power $P_{SRS}$ for each SRS resource in the SRS resource set by a factor $s_1$ for the SRS resources in the SRS resource set comprising of the first SRS resource, and by a factor $s_2$ for the SRS resources in the SRS resource set comprising of the second SRS resource, where $s_1$ is less than or equal to $s_2$. In some embodiments, if within the two collided (or shared) SRS resources, a first SRS resource has antenna ports that are a subset of a second SRS resource's antenna ports, the UE 101 may scale the transmit power $P_{SRS}$ for each SRS resource in the SRS resource set a factor $s_1$ for the SRS resources in the SRS resource set comprising of the first SRS resource, by a factor $s_2$ for the SRS resources in the SRS resource set comprising of the second SRS resource, where $s_1$ is less than or equal to $s_2$. In some embodiments, if within the two collided (or shared) SRS resources, a first SRS resource has time, frequency and code domain resources (e.g., REs, cyclic shifts, SRS sequences) that are a subset of the second SRS resource's time, frequency and code domain resources, the UE 101 may scale the transmit power $P_{SRS}$ for each SRS resource in the SRS resource set a factor $s_1$ for the SRS resources in the SRS resource set comprising of the first SRS resource, by a factor $s_2$ for the SRS resources in the SRS resource set comprising of the second SRS resource. In some embodiments, if within the two collided (or shared) SRS resources, a first SRS resource has antenna ports are a subset of a second SRS resource's ports, the UE 101 may scale the transmit power $P_{SRS}$ for each SRS resource in the SRS resource set a factor $s_1$ for the SRS resources in the SRS resource set comprising of the first SRS resource, by a factor $s_2$ for the SRS resources in the SRS resource set comprising of the second SRS resource. In some embodiments, $s_2$ is equal to 1, and $s_1$ may be less than or equal to 1. In other embodiments, the factor may be determined by $s_1 = NP_1/NP_2$, where $NP_1$ is the number of ports in the first SRS resource, and $NP_2$ is the number of ports in the second SRS resource. Moreover, the UE 101 may scale the transmit power $P_{SRS}$ for other resources in the SRS resource sets by a factor of 1.

Figure 4A:
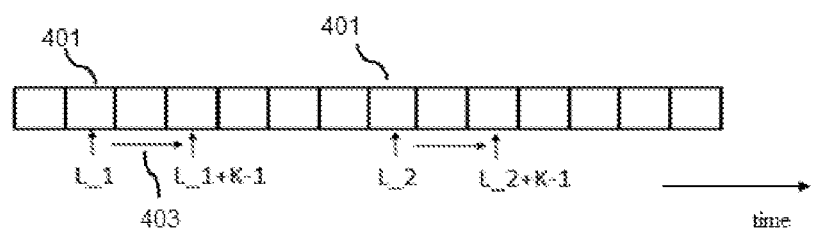
FIGS. 4A-4C illustrate timing diagrams for an SRS resource allocation, in accordance with various embodiments of the disclosure.
Figure 4B:
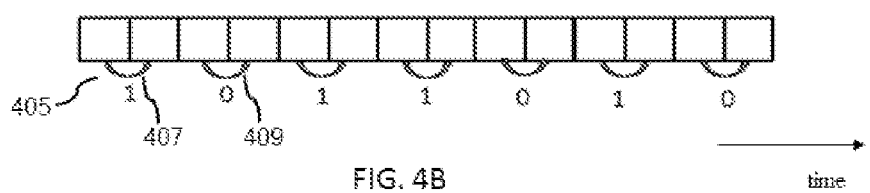
Figure 4C:
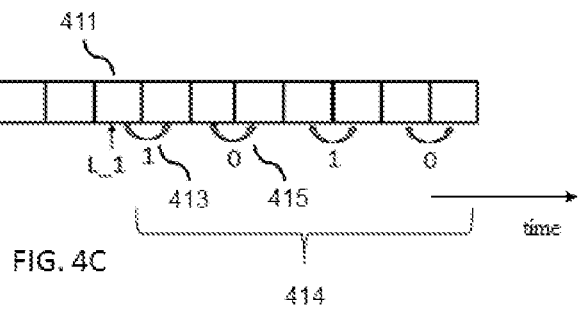

FIGS. 4A-4C illustrate timing diagrams for an SRS resource allocation, in accordance with various embodiments of the disclosure. In some embodiments of the present disclosure, the BS 103 may configure a time domain location when the SRS resource is transmitted by the UE 101. For example, as shown in FIG. 4A, the BS 103 may configure a plurality of time domain locations 401 (e.g., indicated by L_1 and L_2 time slots) indicating start locations of OFDM symbols of the SRS resource within a slot 400A. In various embodiments, the time domain location may be indicated by a time domain slot, wherein the time domain slot may include one or more concurrent resource blocks (RBs). In some embodiments, in the 5G NR wireless communication node, the slot 400A comprises a predetermined number N (e.g., N=14) of OFDM symbols. In other embodiments, within the slot 400A, a variable number τ, of OFDM symbols may be dedicated to the transmission of SRSs, while the remaining N-τ OFDM symbols may be allocated for UL data. In further embodiments, the BS 103 may also configure a length (K) of consecutive OFDM symbols used by the SRS resource. In one exemplary embodiment, the SRS resource may occupy 403 (K) OFDM symbols starting from a start position 401. In some embodiments value K can be the number of OFDM symbols in a repetition or a frequency hop. One exemplary advantage of this approach, unlike prior solutions that restrict the time domain locations of the SRS resources, is that it allows for flexibility of the symbol locations of the SRS resource. Furthermore, this approach also allows the SRS resource to occupy non-continuous OFDM symbols.

In some embodiment, the BS 103 may configure a bitmap 405 to indicate OFDM symbols occupied in a slot 400B by an SRS resource. In various embodiments, a size of the bitmap may be determined by a number of OFDM symbols in the slot 400B. In another example, the size of the bitmap may be determined based on the number of OFDM symbols, a number of frequency hops and/or a number of repetitions in the slot 400B. Each bit 407/409 in the bitmap 405 may be associated with a set of repetition symbols or a frequency hop, as shown in FIG. 4B.

In some embodiment, the BS 103 may configure a start symbol 411 and a bitmap 414 to indicate OFDM symbols occupied by the SRS resource in a slot 400C. The start symbol 411 indicates a first symbol location of the SRS resource in the slot 400C. From the first symbol 411 to a last symbol of the slot 400C, there may be an S number of symbols in total. In some embodiments, the size of the bitmap may be determined by the S number of symbols, a number of frequency hops and/or a number of repetitions. In various embodiment, each bit 413/415 in the bitmap may be associated with a set of repetition symbols or a frequency hop as shown in FIG. 4C.

In some embodiments, a transmission of the SRS resource may be in aperiodic fashion. As such, an aperiodic SRS resource transmission by the UE 101 may be triggered by the BS 103 after receiving a physical downlink control channel (PDCCH) with downlink control information (DCI) that explicitly triggers the SRS resource set(s). In particular, the BS 103 may configure a triggering time slot offset measured in a number of time slots between the time slot in which the DCI trigger is received and the time slot containing the aperiodic SRS resource transmission. In various embodiments, the triggering time slot offset may take values between 0 and 6 time slots, where 0 refers to the same time slot in which the DCI trigger is received by the UE 101. In some embodiments, the triggering time slot offset may be configured at the SRS resource set(s) level. Hence, the SRS resources within the SRS resource set(s) may be configured/activated/triggered on per-set basis.

In further embodiments of the present disclosure, the BS 103 may configure one or more triggering time slot offsets for one or more subsets of the SRS resource set(s). In this embodiment, each triggering time slot offset is associated with one subset of the SRS resource set(s). In this embodiments, the SRS resources within the subset of SRS resource set(s) may have the same triggering time slot offset. Moreover, the resources in one subset of the SRS resource set(s) may be transmitted in the same time slot. One exemplary advantage of this embodiment, unlike previously described approach that allowed only a single triggering time slot offset per the SRS resource set(s), is that it allows for one or more triggering time slot offsets per the SRS resource set(s). This approach also provides for flexible determination of the one or more triggering time slot offsets.

In some embodiments, the UE 101 may determine a number of subsets of the SRS resource set(s) based on a configuration parameter or a pre-defined rule. In various embodiments, the subsets of the SRS resource set(s) may be formed based on the number of subsets and the order of SRS resources within the SRS resource set(s). The order of the SRS resources may be determined based on SRS resource IDs. In various embodiments, the subsets of the SRS resource set(s) may have an equal number of SRS resources. In other embodiments, a list specifying a bijective (e.g., one-to-one) mapping between triggering time slot offsets and the subsets of SRS resource set(s) may be configured. In some embodiments, the BS 103 may configure a subset ID for each subset of the SRS resource set(s). In this embodiment, each subset ID may be mapped to a triggering time slot offset.

In further embodiments, the BS 103 may configure triggering time slot offsets for each SRS resource in the SRS resource set(s). Additionally, a number of time slots configured for the transmission of the SRS resources in the SRS resource set(s) may be restricted to be no larger than a pre-defined value M. In other embodiments, the number of the time slots may be configured by the BS 103. Moreover, in other exemplary embodiments, the number of the time slots may be carried in a capability signaling of the UE 101.

In another embodiment, a maximum time range (M) measured in terms of time slots or OFDM symbols for the transmission of the SRS resources in the SRS resource set(s) may be determined by the UE 101. In other embodiments, the BS 103 may configure the maximum time range M for the transmission of the SRS resources. In this embodiment, the maximum time range M may be defined as a maximum number of the OFDM symbols or time slots between the earliest and last SRS resource transmissions. In some embodiments, the maximum time range M may be determined based on the difference between the largest triggering time slot offset and the smallest triggering time slot offset for the SRS resources in the SRS resource set(s). Moreover, the maximum time range M may be configured by the BS 103. In addition, the maximum time range M may also be a pre-determined value. Moreover, in other exemplary embodiments, the maximum time range M may be carried in a capability signaling of the UE 101.

FIGS. 5A-5B illustrate block diagram of radio frequency (RF) transceiver chains. As shown in FIG. 5A, the UE 101 may include antennas 503 and a single RF chain with a power amplifier 501. In other embodiments, the UE 101 may include antennas 509 and two parallel RF chains with power amplifiers 505 and 507, as shown in FIG. 5B. In some embodiments, the UE 101 may report its capabilities including the number of RF chains to the BS 103. In further embodiments, the UE 101 may report its capability of transmit power sharing among antennas configured for one or more usages to the BS 103. In other embodiments, the UE 101 may report whether a maximum transmit power of one SRS resource usage (e.g., antenna switching) equals to a maximum transmit power of another SRS resource usage (e.g., UL transmission). In other embodiments, the UE 101 may report a ratio between the maximum transmit power of one SRS resource usage (e.g., antenna switching) and a maximum transmit power of another SRS recourse usage (e.g., UL transmission). In some embodiments, the ratio may be one of ¼, ½, 1, 2 and 4.

In other embodiments, the UE 101 may report whether the maximum transmit power of $N_1$-antenna SRS equals to the maximum transmit power of $N_2$-antenna SRS, where $N_1<N_2$. In other embodiments, the UE 101 may report a minimum number of antennas for the SRS transmission that achieves a full transmit power. In other embodiments, the UE 101 may report a maximum or minimum power scaling value(s) for the SRS transmission. In other embodiments, the capabilities of the UE 101 may be delivered implicitly from other control signals. For example, the control signals related to UL full power transmit may be used to determine the capabilities of the UE 101. In other embodiments, the UE 101 may report its capability per SRS resource usage type. For example, for the usage of antenna switching, each types corresponds to one combination of x and y in the xTyR capability, where x is the number of transmit (Tx) antennas and y is the number of receive (Rx) antennas. In other embodiments, the UE 101 may report its capability if multiple types are supported per SRS resource usage. For example, for the usage of antenna switching, the UE 101 may report its capability if the UE 101 supports multiple combinations of x and y in the xTyR capability, or multiple x values exist in the supported combinations of x and y. In other embodiments, the UE 101 may report its capability if the maximum number of antenna ports for one usage (e.g., antenna switching) does not equal to the maximum number of antenna ports for another usage (e.g., UL transmission) or its SRS. Otherwise, the UE 101 may not report its capability.

Figure 6:
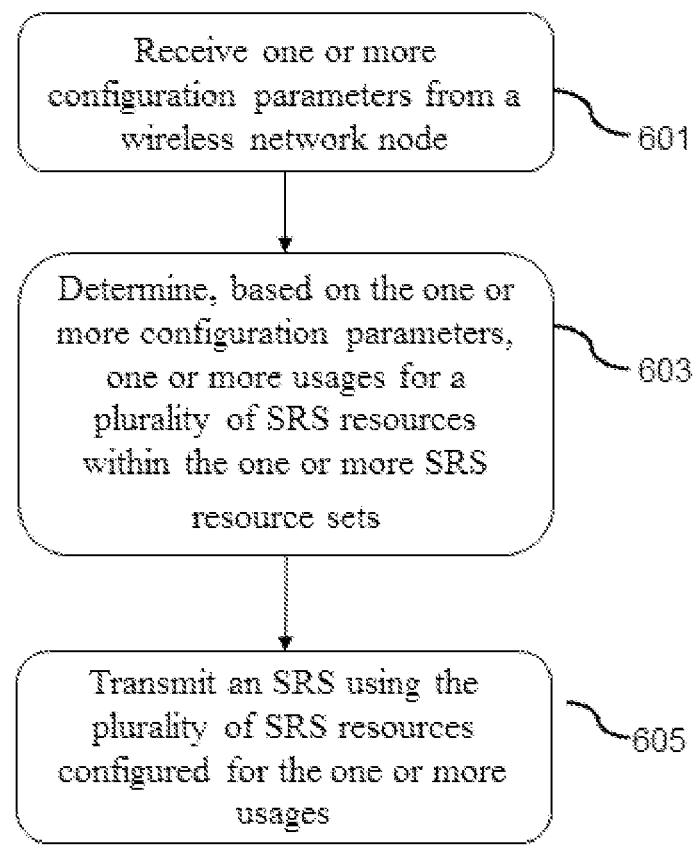
FIG. 6 is a block diagram of a flowchart of a method for transmitting one or more sounding reference signal (SRS) resource sets for one or more usages, in accordance with various embodiments of the disclosure.

FIG. 6 is a block diagram of a flowchart of a method for transmitting one or more sounding reference signal (SRS) resource sets for one or more usages, in accordance with various embodiments of the disclosure. In some embodiments, the flowchart shown in FIG. 6 may be performed, e.g., by the UE 101.

Figure 7:
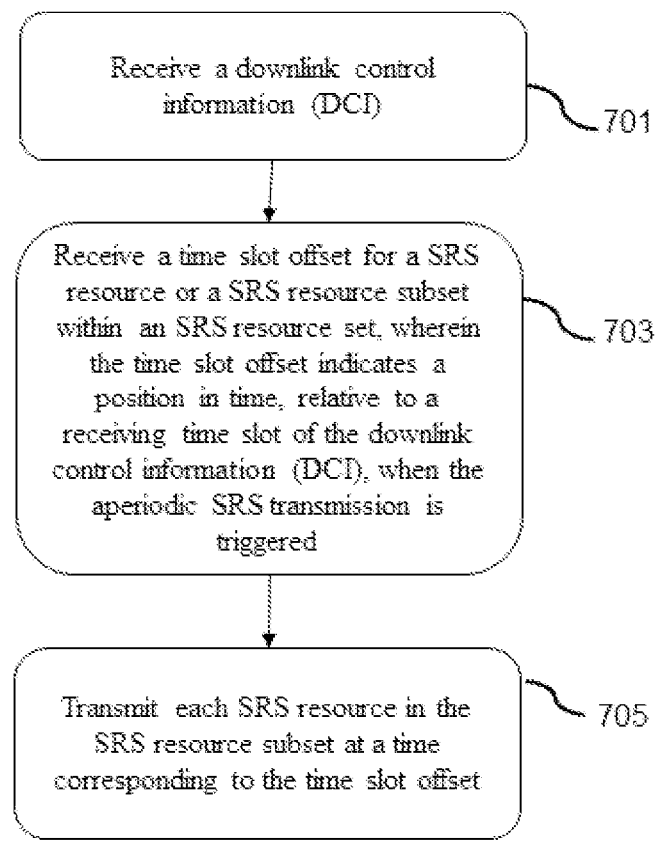
FIG. 7 illustrates is a block diagram of a flowchart of a method for transmitting an aperiodic sounding reference signal (SRS), in accordance with various embodiments of the disclosure.

In block 601, the UE 101 may receive one or more configuration parameters from the BS 103. In block 603, the UE 101 may determine, based on the one or more configuration parameters, one or more usages for a plurality of SRS resources within the one or more SRS resource sets. In block 605, the UE 101 may transmit an SRS using the plurality of SRS resources configured for the one or more usages FIG. 7 illustrates is a block diagram of a flowchart of a method for transmitting an aperiodic sounding reference signal (SRS), in accordance with various embodiments of the disclosure. In some embodiments, the flowchart shown in FIG. 7 may be performed, e.g., by the UE 101.

In block 701, the UE 101 may receive a downlink control information (DCI) from the BS 103. In block 703, the UE 101 may receive a time slot offset for a SRS resource or a SRS resource subset within an SRS resource set, wherein the time slot offset indicates a position in time, relative to a receiving time slot of the downlink control information (DCI), when the aperiodic SRS transmission is triggered. In block 705, the UE 101 may transmit each SRS resource in the SRS resource set or in the SRS resource subset at a time corresponding to the time slot offset.

Figure 8:
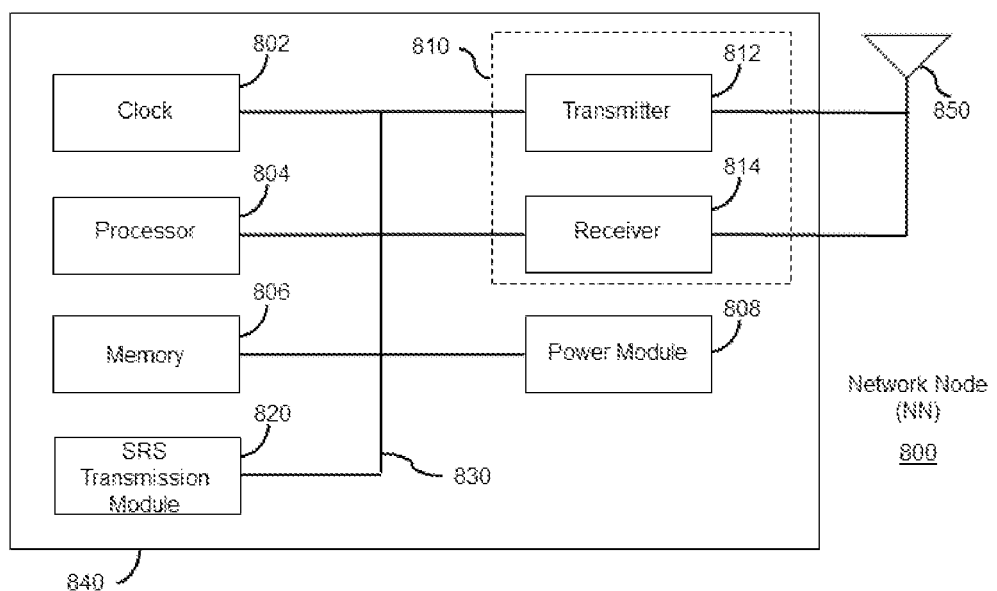
FIG. 8 illustrates a block diagram of a wireless communication node configured to perform the methods disclosed herein, in accordance with various embodiments of the disclosure.

FIG. 8 illustrates a block diagram of a network node (NN) 800, in accordance with various embodiments of the disclosure. The NN 800 is an example of a wireless communication node that can be configured to implement the various methods described herein. In some embodiments, the NN 800 may be wireless communication node such as a user equipment (UE), as described herein. In other embodiments, the NN 800 may be a wireless communication device such as a base station (BS), as described herein. As shown in FIG. 8, the NN 800 includes a housing 840 containing a system clock 802, a processor 804, a memory 806, a transceiver 810 comprising a transmitter 812 and receiver 814, a power module 808, and an SRS transmission module 820.

In this embodiment, the system clock 802 provides the timing signals to the processor 404 for controlling the timing of all operations of the NN 800. The processor 804 controls the general operation of the NN 800 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 806, which can include both read-only memory (ROM) and random access memory (RAM), can provide instructions and data to the processor 804. A portion of the memory 806 can also include non-volatile random access memory (NVRAM). The processor 804 typically performs logical and arithmetic operations based on program instructions stored within the memory 806. The instructions (a.k.a., software) stored in the memory 806 can be executed by the processor 804 to perform the methods described herein. The processor 804 and memory 806 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 810, which includes the transmitter 812 and receiver 814, allows the NN 800 to transmit and receive data to and from an external network node (e.g., a BS or UE). An antenna 850 is typically attached to the housing 840 and electrically coupled to the transceiver 810. In various embodiments, the NN 800 includes (not shown) multiple transmitters, multiple receivers, and multiple transceivers. In some embodiments, the antenna 850 includes a multi-antenna array that can form a plurality of beams each of which points in a distinct direction in accordance with MIMO beamforming techniques.

The SRS transmission module 820 may be implemented as part of the processor 804 programmed to perform the functions herein, or it may be a separate module implemented in hardware, firmware, software or a combination thereof. In accordance with various embodiments, the SRS transmission module 820 is configured to transmit a periodic/aperiodic sounding reference signals configured for multiple usages, as discussed above. In some embodiments, the SRS transmission module 820 can be implemented as software (i.e., computer executable instructions) stored in a non-transitory computer-readable medium that when executed by processor 804, transform the processor 804 into a special-purpose computer to perform the nulling operations described herein.

The various components and modules discussed above within housing 840 are coupled together by a bus system 830. The bus system 830 can include a data bus and, for example, a power bus, a control signal bus, and/or a status signal bus in addition to the data bus. It is understood that the modules of the NN 800 can be operatively coupled to one another using any suitable techniques and mediums. It is further understood that additional modules (not shown) may be included in the NN 800 without departing from the scope of the disclosure.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for transmitting a sounding reference signal (SRS), comprising:
   receiving time slot offsets for SRS resources or an SRS resource subset within an SRS resource set, wherein each of the time slot offsets indicates a position in time, relative to a receiving time slot of a downlink control information (DCI) when an SRS transmission is to be triggered;
   receiving the DCI;
   determining a length of a time interval for transmission of the SRS resources in the SRS resource set, wherein the length of time interval is equal to or smaller than a pre-determined value comprising at least one of a fixed value and a value reported in a capability signaling, and wherein the length of the time interval is a difference between a largest time slot offset among the SRS resources in the SRS resource set and a smallest time slot offset among the SRS resources in the SRS resource set; and
   transmitting each SRS resource in the SRS resource subset or in the SRS resource set at a time corresponding to the time slot offsets based on the determined length of the time interval.

2. The method of claim 1, further comprising:
   forming a plurality of SRS resource subsets based on a configuration parameter indicating a number of the plurality of SRS resource subsets
   transmitting the SRS for the SRS resources of the SRS resource set in a number of time slots corresponding to the time interval.

3. The method of claim 2, wherein the SRS resources within the SRS resource set are mapped to an SRS resource subset from among the plurality of SRS resource subsets based on at least one of the number of the plurality of SRS resource subsets and an order of identification numbers of the SRS resources.

4. The method of claim 3, wherein each SRS resource subset in the plurality of SRS resource subsets has a same number of SRS resources.

5. The method of claim 1, further comprising:
   receiving one or more configuration parameters indicating at least one of one or more starting positions of one or more sets of continuous Orthogonal Frequency-Division Multiplexing (OFDM) symbols or continuous uplink (UL) OFDM symbols and a bitmap indicating a selection of OFDM symbols;
   determining a set of time domain resources for transmitting the SRS based on the one or more configuration parameters; and
   transmitting the SRS within the set of time domain resources.

6. The method of claim 5, wherein each set in the one or more sets of the continuous OFDM symbols or the continuous UL OFDM symbols has an identical number of the OFDM symbols.

7. The method of claim 5, wherein a size of the bitmap is determined by at least one of: a number of the OFDM symbols within one or more time slots, a number of the UL OFDM symbols within the one or more time slots, a number of the OFDM symbols between the one or more starting positions and a last OFDM symbol within the one or more time slots, or a number of frequency hops or repetitions within one or more time slots.

8. The method of claim 5, further comprising:
associating each bit in the bitmap with a group of the OFDM symbols or a group of the UL OFDM symbols; or
associating each bit in the bitmap with a group of OFDM symbols having same frequency hopping patterns or repeated OFDM symbols in a time domain.

9. A method for receiving a sounding reference signal (SRS), comprising:
transmitting time slot offsets for SRS resources or an SRS resource subset within an SRS resource set, wherein each of the time slot offsets indicates a position in time, relative to a receiving time slot of a downlink control information (DCI) when an SRS transmission is to be triggered;
transmitting the DCI; and
receiving each SRS resource in the SRS resource subset or in the SRS resource set at a time corresponding to the time slot offset, the SRS resources being received during a time interval, wherein a length of the time interval is equal to or smaller than a pre-determined value comprising at least one of a fixed value and a value reported in a capability signaling, and wherein the length of the time interval is a difference between a largest time slot offset among the SRS resources in the SRS resource set and a smallest time slot offset among the SRS resources in the SRS resource set.

10. The method of claim 9, further comprising:
transmitting a configuration parameter indicating a number of a plurality of SRS resource subsets; and
receiving the SRS for the SRS resources of the SRS resource set in a number of time slots corresponding to the time interval.

11. The method of claim 10, wherein the SRS resources within the SRS resource set are mapped to an SRS resource subset from among the plurality of SRS resource subsets based on at least one of the number of the plurality of SRS resource subsets and an order of identification numbers of the SRS resources.

12. The method of claim 10, wherein each SRS resource subset in the plurality of SRS resource subsets has a same number of SRS resources.

13. The method of claim 9, further comprising:
transmitting at least one configuration parameter indicating a time domain location within a time slot for transmitting each SRS resource.

14. The method of claim 9, further comprising:
transmitting one or more configuration parameters indicating at least one of one or more starting positions of one or more sets of continuous Orthogonal Frequency-Division Multiplexing (OFDM) symbols or continuous uplink (UL) OFDM symbols and a bitmap indicating a selection of OFDM symbols;
determining a set of time domain resources for receiving the SRS based on the one or more configuration parameters; and
receiving the SRS within the set of time domain resources.

15. The method of claim 14, wherein each set in the one or more sets of the continuous OFDM symbols or the continuous UL OFDM symbols has an identical number of the OFDM symbols.

16. The method of claim 14, wherein a size of the bitmap is determined by at least one of a number of the OFDM symbols within one or more time slots, a number of the UL OFDM symbols within the one or more time slots, a number of the OFDM symbols between the one or more starting positions and a last OFDM symbol within the one or more time slots, or a number of frequency hops or repetitions within one or more time slots.

17. The method of claim 14, further comprising:
associating each bit in the bitmap with a group of the OFDM symbols or a group of the UL OFDM symbols; or
associating each bit in the bitmap with a group of OFDM symbols having same frequency hopping patterns or repeated OFDM symbols in a time domain.

18. An apparatus for transmitting a sounding reference signal (SRS), comprising:
a memory storing program instructions; and
a processor configured to execute the program instructions to cause the apparatus to perform steps comprising:
receiving time slot offsets for SRS resources or an SRS resource subset within an SRS resource set, wherein each of the time slot offsets indicates a position in time, relative to a receiving time slot of a downlink control information (DCI) when an SRS transmission is to be triggered;
receiving the DCI;
determining a length of a time interval for transmission of the SRS resources in the SRS resource set, wherein the length of time interval is equal to or smaller than a pre-determined value comprising at least one of a fixed value and a value reported in a capability signaling, and wherein the length of the time interval is a difference between a largest time slot offset among the SRS resources in the SRS resource set and a smallest time slot offset among the SRS resources in the SRS resource set; and
transmitting each SRS resource in the SRS resource subset or in the SRS resource set at a time corresponding to the time slot offset based on the determined length of the time interval.

19. The apparatus of claim 18, wherein the processor is further configured to cause the apparatus to perform steps comprising:
receiving one or more configuration parameters indicating at least one of one or more starting positions of one or more sets of continuous Orthogonal Frequency-Division Multiplexing (OFDM) symbols or continuous uplink (UL) OFDM symbols and a bitmap indicating a selection of OFDM symbols;
determining a set of time domain resources for transmitting the SRS based on the one or more configuration parameters; and
transmitting the SRS within the set of time domain resources.

20. An apparatus for receiving a sounding reference signal (SRS), comprising:
a memory storing program instructions; and
a processor configured to execute the program instructions to cause the apparatus to perform steps comprising:
transmitting time slot offsets for SRS resources or an SRS resource subset within an SRS resource set, wherein each of the time slot offsets indicates a position in time, relative to a receiving time slot of a downlink control information (DCI) when an SRS transmission is to be triggered;
transmitting the DCI; and
receiving each SRS resource in the SRS resource subset or in the SRS resource set at a time corresponding to the time slot offset, the SRS resources being received during a time interval, wherein a length of the time interval is equal to or smaller than a pre-determined value comprising at least one of a fixed value and a value reported in a capability signaling, and wherein the length of the time interval is a difference between a largest time slot offset among the SRS resources in the SRS resource set and a smallest time slot offset among the SRS resources in the SRS resource set.

21. The apparatus of claim 20, wherein the processor is further configured to cause the apparatus to perform steps comprising:
- transmitting one or more configuration parameters indicating at least one of one or more starting positions of one or more sets of continuous Orthogonal Frequency-Division Multiplexing (OFDM) symbols or continuous uplink (UL) OFDM symbols and a bitmap indicating a selection of OFDM symbols;
- determining a set of time domain resources for receiving the SRS based on the one or more configuration parameters; and
- receiving the SRS within the set of time domain resources.

\* \* \* \* \*